No. 755,896. PATENTED MAR. 29, 1904.
D. H. LINTHICUM.
CONTINUOUS BALING PRESS.
APPLICATION FILED JULY 2, 1903.
NO MODEL.
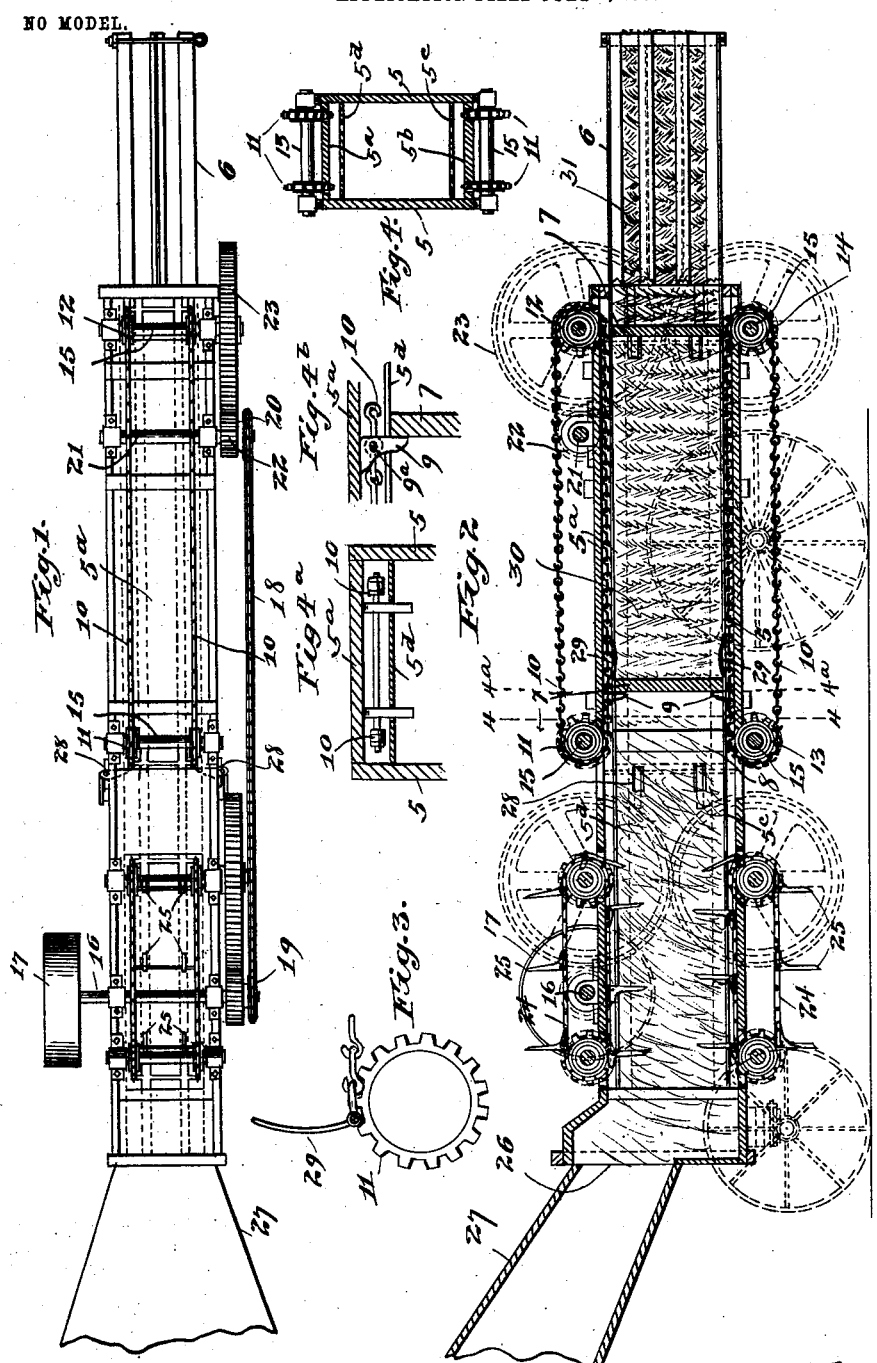

No. 755,896. Patented March 29, 1904.

UNITED STATES PATENT OFFICE.

DAVID H. LINTHICUM, OF PITTSBURG, KANSAS.

CONTINUOUS BALING-PRESS.

SPECIFICATION forming part of Letters Patent No. 755,896, dated March 29, 1904.

Application filed July 2, 1903. Serial No. 164,051. (No model.)

*To all whom it may concern:*

Be it known that I, DAVID H. LINTHICUM, a citizen of the United States, residing at Pittsburg, in the county of Crawford, State of Kansas, have invented certain new and useful Improvements in Continuous Baling-Presses, of which the following is a specification.

This invention relates to that class of baling-presses having a straight chamber through which the hay is fed, in which it is compacted, and in which the bale is tied, the hay charged into one end of the chamber being gradually advanced to the point where the pressure is applied and the bale formed against the resistance of a completed bale which has been advanced into the delivery portion of the chamber.

My improvements relate mainly to a press of this character in which the action of the press is continuous, the tying being effected without interrupting the progress of the hay through the chamber and the completed bale being ejected by the pressure of the forming bale.

My improved baling-press is so constructed as to be adapted for connection with a separator or other straw-producing machine, so that the straw may be taken directly from the raddles of the separator and delivered from the end of the machine in the form of bales.

My invention will be described in connection with the accompanying drawings and pointed out in the claims.

In the said drawings, Figure 1 is a plan view, and Fig. 2 a sectional elevation, of a press embodying my improvements. Fig. 3 is a detail view of one of the compressing-chains and the finger carried thereby for separating the incoming hay, so as to permit the insertion of a follower-board. Fig. 4 is a cross-section on line 4 4 of Fig. 2. Fig. 4ª is a partial cross-section on the line 4ª of Fig. 2, and Fig. 4ᵇ is a detailed sectional view taken longitudinally of the baling-chamber.

In general construction my improved press is composed of a rectangular body portion opened at both ends and mounted, if desired, upon carrying or ground wheels, so as to make it transportable, and adapted also, by preference, for connection to the straw-delivery trunk of a separator or other straw-producing or feeding machine.

In the particular construction represented in the drawings the body of the machine is composed of the side walls 5, top and bottom walls 5ª and 5ᵇ, and the top and bottom plates 5ᶜ and 5ᵈ. The outer or inclosing walls may be of wood; but the top and bottom plates 5ᶜ and 5ᵈ are preferably of sheet metal or boiler-plate and are arranged at such distances from the top and bottom walls 5ª and 5ᵇ as to permit the working of the sprocket-chains therein. The terminal portion of the chamber (marked 6) may be of a slatted construction and will be hereinafter referred to as the "bale-chamber." That part of the chamber adjacent to the bale-chamber will be designated as the "compressing-chamber," and the initial portion will be designated as the "feed-chamber."

In this press the compression of a bale is effected through the instrumentality of follower-blocks 7, which are adapted to be inserted laterally through an aperture in the side wall 5, as indicated at 8 in Fig. 2. These follower-blocks are caused to traverse the bale-chamber by means of lugs 9, mounted on cross-rods 9ª, carried by endless sprocket-chains 10, the latter being carried over sprocket-wheels 11, 12, 13, and 14, carried by cross-shafts 15, mounted in suitable bearings at the top and bottom of and exterior to the inclosing walls 5ª 5ᵇ, and the lugs working through slots in the top and bottom plates. These chains may be driven in any suitable or convenient way, the driving mechanism shown comprising the power-shaft 16, carrying a driving-pulley 17, and the sprocket-chain 18, trained over the sprockets 19 and 20, and the power being transmitted from the counter-shaft 21 through a pinion 22, driving the large gear 23 on one of the shafts 15. From the main shaft 16 power is also taken to drive the feed-chains 24, having pivoted teeth 25 thereon which are adapted to be held rigidly by contact with the inner surface of the top and bottom walls 5ª and 5ᵇ and which travel through slots or slits in the top and bottom plates 5ᶜ and 5ᵈ. The material is received through the mouth portion 26, which communicates with a delivery-chute 27, which may be the terminal portion of the delivery from a threshing-machine or other straw producing or feeding apparatus. Detaining dogs or fingers 28 are shown having their points projected into the operating-space of the feed-chamber adjacent to the aperture 8, so as to normally separate the incoming straw from the mass in the forming bale. Other separating-fingers, 29, are pivoted to the compressing-chains 10 in such a manner that they fold upon the chain and travel flatwise over the forming bale, which is indicated by the shade-lines at 30, while the incoming straw is similarly shown in the feed-chamber, and the formed bale is indicated at 31 in the bale-chamber. These fingers 29 are preferably composed of spring-wire and become rigid with the chain as they pass over the sprockets 11 to 13, as indicated in Fig. 3, thus serving to carry the loose material forward in advance of the insertion of one of the follower-blocks 7. These spring-fingers are arranged sufficiently in advance of the lugs 9 to permit the insertion of the follower-block, which is then engaged upon its rearward side by the lugs 9, and the mass of hay is thus compressed against the previously-inserted follower-block, which in turn rests against the end of the tied bale.

The operation is as follows: The material being fed from the chute 27 and entering through the mouthpiece 26 is fed forward by the teeth 25 on the feed-belts 24. The loose masses of hay are similarly restrained and separated from the forming bale by the detaining-dogs 28; but the bale-chamber gradually fills until sufficient is accumulated for the formation of a bale, whereupon one of the follower-blocks is inserted through the aperture 8 just after the action of the separating-fingers 29 and in advance of the lugs 9, whereupon the follower is picked up by the lugs and carried forward, compressing the bale, which in turn forces the tied bale out and itself takes position in the tying-chamber. The action is continuous, and the tying may be effected in the intervals between the compression or while the bale is being forced out of the tying-chamber.

I do not limit my invention to the particular structure herein shown, for obviously many of the structural details may be varied within the scope of the invention.

I claim—

1. In a baling-press having a continuous-operating chamber to which the material is fed and in which it is compressed and the bale tied, the combination with a feeding mechanism for delivering the material to the compressing mechanism and a compressing mechanism comprising followers and endless carriers arranged parallel to the chamber and having means for engaging the followers to move them lengthwise of the chamber whereby to compress the bale, substantially as described.

2. In a baling-press of the character described, the combination with the feeding mechanism adapted to move the straw through the initial portion of the chamber, endless carriers arranged in line with the feeding mechanism, and followers adapted to be moved thereby through an intermediate portion of the chamber, and a terminal portion in which the bale is tied, the tied bale affording the abutment or resistance to the compressing action of the followers, substantially as described.

3. A baling-press of the character described, having an initial portion or mouthpiece to receive the material, a feeding mechanism arranged adjacent thereto, means projecting within the chamber for restraining the loose material, endless carriers having means also projected within the chamber to engage a follower, and followers adapted to be inserted laterally through the wall of the chamber and to be carried lengthwise thereof to compress the bale and a terminal portion of said chamber wherein the bale is tied, substantially as described.

4. In a baling-press of the class described, a continuous-operating chamber having arranged adjacent to the initial portion thereof a feed mechanism for carrying the loose material therethrough, means for restraining the loose material arranged inwardly of the feed-chamber, endless carriers arranged in line with the feed mechanism and having means projecting into the operating-chamber for engaging the followers therein, followers adapted to be inserted laterally into said chamber and means connected with the carrier for separating the material within the chamber to permit the insertion of the follower, substantially as described.

5. A baling-press of the class described having a continuous-operating chamber, feeding mechanism and compressing mechanism arranged adjacent to said chamber and in line with each other, said chamber having a mouth portion adapted for connection with and to receive material form a separator or similar straw-producing machine and a terminal portion in which the bale is tied, substantially as described.

6. In a baling-press of the class described, the combination with a continuous-operating chamber having a feeding mechanism and a compressing mechanism having endless chains provided with feeding means carried thereby and endless chains provided with lugs for effecting the compression of the bale, and means for driving said feeding and compressing chains continuously, said chamber having lateral openings for the insertion of follower-blocks, and means intermediate the feeding and compressing mechanisms for separating the material to permit the insertion of the followers, substantially as described.

7. In a baling-press of the class described, the combination with the operating-chamber of a receiving-spout leading thereto, endless feed-belts having pivoted teeth projected into the chamber and adapted to be made rigid while passing through said chamber, dogs or fingers mounted in the side walls of said chamber and projected therein to restrain the material, endless carrying-chains provided with lugs protruding within the chamber, a lateral opening in the side wall of the chamber to permit the insertion of a follower, followers adapted for insertion within the chamber and to be engaged by the lugs on the carrying-chains, fingers pivotally connected with the carrying-chains but adapted to become rigid therewith for the purpose of separating the material prior to the insertion of the follower, and suitable gearing for driving the several operative mechanisms in due order and relation, whereby material fed to the machine through the receiving-spout is carried through the initial portion of said chamber separated for the insertion of the follower, compressed by the movement of said follower into a bale, and tied in the terminal portion of said chamber, all substantially as and for the purpose described.

DAVID H. LINTHICUM.

Witnesses:
OTTO GREEF,
R. E. CARLETON.